UNITED STATES PATENT OFFICE 2,451,375

CONVERSION OF HYDROCARBONS

Richmond T. Bell, Highland Park, Ill., assignor to The Pure Oil Company, Chicago, Ill., a corporation of Ohio No Drawing. Application April 17, 1944, Serial No. 531,488

5 Claims. (Cl. 196—52)

This invention relates to the conversion of hydrocarbons containing three or more carbon atoms to a molecule into hydrocarbons of lesser number of carbon atoms per molecule and into hydrocarbons of high anti-knock value.

An object of the invention is to provide a method for converting hydrocarbons into lower boiling hydrocarbons.

A further object of the invention is to provide a method for accelerating rate of conversion of hydrocarbons in thermal cracking operations.

Still another object of the invention is to provide a method for increasing the anti-knock value of motor fuel made by thermal cracking of hydrocarbon oil.

A still further object of the invention is to provide a catalyst for improving thermal cracking of hydrocarbons.

In accordance with my invention, hydrocarbons to be cracked are mixed with (1) a small amount of halogen-containing ester or organic salt of a phosphorus-containing acid, or (2) a small amount of a mixture of an ester of an oxygen-containing acid of phosphorus and a small amount of halogen, hydrogen halide, halogen halide phosphorus halide or oxyhalide or sulfur halide or oxyhalide, carbon tetrahalides, organic halogen compound, such as saturated or unsaturated alkyl, aryl or aralkyl halides, halogenated esters, ketones and acyl halides or other halogen-containing compounds which decompose at reaction conditions to form free halogen or hydrogen halide.

As examples of halogenated esters or organic salts of phosphorus-containing acids which are useful in carrying out my invention may be mentioned: trichloroethyl phosphite,

tri-dichloropropyl phosphate,

trichlorobromo propyl phosphite,

p-tertiary-butyl phenyl phosphoric acid dichloride and dibromide, (CH₃)₃C.C₆H₄O.PX₂O where X is either chlorine or bromine; p-tertiary amyl phenyl phosphoric acid dichloride or dibromide, (C₂H₅)(CH₃)₂.C₆H₄O.PX₂O where X is either chlorine or bromine; p-tertiaryoctyl phenyl phosphoric acid dichloride or dibromide,

where X is either chlorine or bromine, and esters and salts of hexafluophosphoric acid such as tetraethylammonium phosphorhexafluoride,

Although the halogenated esters and halogenated organic salts of phosphorus acids are generally useful, the bromine-containing esters and salts and the fluorine-containing esters and salts are particularly effective. By organic salt of a phosphorus-containing acid is meant an oxygen-containing phosphorus acid salt containing one or more organic radicals.

Instead of using a halogenated ester or organic salt of a phosphorus acid, a mixture of halogen, hydrogen halide or compound which will decompose to form halogen or hydrogen halide, together with an ester of an oxygen-containing acid of phosphorus, particularly octyl esters, such as di-octyl acid pyrophosphate, tri-octyl acid tetrapolyphosphate and penta-octyl acid tripolyphosphate, may be used. Although I prefer octyl esters of the various oxygen-containing phosphorus acids, neutral or acid mono- or poly-alkyl, aryl or aralkyl derivatives of mono- or polyphosphoric acids or phosphorous acids, or of phosphorus acids in general, or mixtures thereof may be used in conjunction with the halogen, hydrogen halide or halogen compound. Although the halogens aforementioned, in general, are useful, I prefer to use alkyl bromides containing more than one bromine atom per molecule or unsaturated organic halogen compounds, such as allyl bromide.

Where halogen-containing esters or organic salts of phosphorus acids are used, they may be used in amounts ranging from .05 to 5% by weight of the hydrocarbon undergoing cracking, although I prefer not to use amounts in excess of 3%, since when used in amounts below 3% conversion is satisfactory and the presence of objectionable amounts of esters, salts or decomposition products thereof in the products of reaction is avoided. In general, sensitizers will give good results when used in amounts of 1% or less by weight of the charge.

When using mixtures of esters of oxygen-containing acids of phosphorus and halogens or halogen compounds, the mixture should be present in amounts of approximately .05 to 5% by weight of the charge, but the ester should be present in amounts not less than .025% by weight and halogen or halogen compound also should be present in amounts of not less than .025% by weight of the charge.

My invention is applicable to thermal cracking processes carried out at either atmospheric, subatmospheric, or super-atmospheric pressure at temperatures of approximately 350 to 750° C.

Where hydrocarbon oil is undergoing cracking, the sensitizer may be mixed directly with the oil or it may be dissolved in a suitable solvent such as hydrocarbons boiling within the gasoline boiling range and the solution mixed with the oil to be charged; or the sensitizer may be injected directly into the reaction zone in vapor or liquid state or in the form of a solution. Preheating of the sensitizer to a temperature below its decomposition temperature may be resorted to prior to injecting the sensitizer into the reaction zone.

Where the hydrocarbon undergoing cracking is a gas, it may be desirable to inject the sensitizer directly into the reaction zone in the form of a vapor or liquid, although the catalyst may be mixed with the gas before entering the cracking zone either in the form of vapor or atomized liquid, depending on the physical state of the sensitizer.

By injecting the sensitizer directly into the reaction zone, the likelihood of decomposition of the sensitizer before the charge enters the reaction zone is avoided.

Sensitizers in accordance with my invention are useful not only in purely thermal cracking reactions, but may be used in thermal catalytic cracking in which the gas, vapor or liquid undergoing cracking is contacted with either a stationary bed, moving bed or a suspended comminuted catalyst, such as a natural or synthetic alumina-silica or other known cracking catalyst.

The invention is adaptable to use in conventional types of cracking operations without the necessity of modifying the process or apparatus except to make provision for charging the sensitizer to the process.

By using sensitizers in accordance with my invention, not only can the yield of motor fuel from higher boiling hydrocarbon oils be increased above that which is obtainable in the absence of the sensitizer, but the octane number of the motor fuel can also be increased above that obtainable in the absence of the sensitizer.

As an example of a method of carrying out the invention, gas oil may be mixed with 0.5% by weight of ethyl bromide and 0.5% by weight of dioctyl acid pyrophosphate and the mixture subjected to thermal cracking in a conventional type of tubular thermal cracking apparatus at a pressure of 500 pounds per square inch and at a temperature of 475° C. As another example, gas oil may be subjected to cracking in a tubular cracking apparatus at 500 lbs. per square inch at a temperature of 475° C. in the presence of approximately 1% of trichlorobromopropyl phosphite added to the oil prior to charging it to the heating coil. Gasoline which is produced by these operations will exceed in amount and octane number gasoline which can be produced under the same conditions without the sensitizer.

The invention is applicable to cracking of gas, such as propane and butane, to convert them into unsaturated products, such as ethylene and propylene, and to cracking of various liquid hydrocarbons either within or above the gasoline boiling range to convert such hydrocarbons into gasoline boiling hydrocarbons of high octane value.

Although I do not wish to be bound by any theory, it is my belief that halogen-containing esters or organic salts of phosphorus acids not only accelerate the splitting of hydrocarbons under cracking conditions, but also accelerate re-arrangement of straight chain to branched-chain molecules of high anti-knock value. Likewise, it is my belief that the combination of esters of oxygen-containing acids of phosphorus with halogens or halogen compounds has a similar effect.

It is claimed:

1. The method of cracking hydrocarbons comprising subjecting said hydrocarbons to suitable cracking conditions of time, temperature and pressure in the presence of an ester of an oxygen-containing phosphorus acid and a substance selected from the group consisting of halogens, hydrogen halides, carbon tetrahalides and organic halogen compounds.

2. Method in accordance with claim 1 in which the ester is an octyl ester.

3. Method in accordance with claim 1 in which the substance is selected from the group consisting of bromine, hydrogen bromide and compounds which at reaction conditions decompose to form a substance of the group consisting of bromine and hydrogen bromide.

4. Method in accordance with claim 1 in which the ester is an octyl ester and the substance is selected from the group consisting of bromine, hydrogen bromide, and compounds which decompose at reaction conditions to form a substance of the group consisting of bromine and hydrogen bromide.

5. Method in accordance with claim 1 in which the ester is an octyl ester and the substance is selected from the group consisting of bromine, hydrogen bromide and organic bromine compounds which at reaction conditions decompose to form a substance of the group consisting of bromine and hydrogen bromide.

RICHMOND T. BELL.

REFERENCES CITED

The following references are of record in the file of this patent:

UNITED STATES PATENTS

| Number | Name | Date |
| --- | --- | --- |
| 1,925,421 | van Peski | Sept. 5, 1933 |
| 2,221,952 | Pier et al | Nov. 19, 1940 |
| 2,411,200 | Folkins et al | Nov. 19, 1946 |